(12) United States Patent
Takenaka et al.

(10) Patent No.: US 8,162,092 B2
(45) Date of Patent: Apr. 24, 2012

(54) FRICTION DRIVE VEHICLE

(75) Inventors: Toru Takenaka, Saitama (JP); Makoto Hirano, Saitama (JP); Hideharu Izumi, Saitama (JP); Kazuya Kuwabara, Saitama (JP); Taiji Koyama, Saitama (JP); Masao Sasaki, Saitama (JP); Hiroshi Gomi, Saitama (JP); Shinichiro Kobashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 12/633,300

(22) Filed: Dec. 8, 2009

(65) Prior Publication Data
US 2010/0139996 A1    Jun. 10, 2010

(30) Foreign Application Priority Data

Dec. 10, 2008  (JP) .................................. 2008-314309

(51) Int. Cl.
*B62M 13/00* (2010.01)
(52) U.S. Cl. ........ 180/222; 180/228; 180/221; 301/5.23
(58) Field of Classification Search .................. 280/205; 180/10, 20, 7.1, 21, 221, 222; 301/5.1, 5.23
See application file for complete search history.

(56) References Cited

U.S. PATENT DOCUMENTS

| | | | | |
|---|---|---|---|---|
| 3,746,117 | A * | 7/1973 | Alred | 180/21 |
| 6,343,667 | B2 * | 2/2002 | Sauve | 180/228 |
| 2006/0249313 | A1 * | 11/2006 | Kamen et al. | 180/7.1 |
| 2007/0158117 | A1 * | 7/2007 | Alexander | 180/21 |
| 2008/0105471 | A1 * | 5/2008 | Kamen et al. | 180/7.1 |
| 2009/0288900 | A1 * | 11/2009 | Takenaka et al. | 180/218 |
| 2010/0096905 | A1 * | 4/2010 | Takenaka et al. | 301/5.23 |
| 2011/0067939 | A1 * | 3/2011 | Takenaka | 180/21 |

FOREIGN PATENT DOCUMENTS
JP        3820239        9/2006
* cited by examiner

*Primary Examiner* — Tashiana Adams
(74) *Attorney, Agent, or Firm* — Carrier Blackman & Associates, P.C.; Joseph P. Carrier; William D. Blackman (57) ABSTRACT

In a frictional drive vehicle, a load acting on the vehicle such as the weight of a rider is converted into a force that urges two frictionally engaging parts (3L, 3R, 25) toward each other. Thereby, the contact pressure between the two frictionally engaging parts is maintained at an optimum level under all conditions. A weight of a rider may be transmitted to a drive member that frictionally engages a main wheel via a four-link parallel link mechanism (40, 50).

12 Claims, 6 Drawing Sheets

FRICTION DRIVE VEHICLE

TECHNICAL FIELD

The present invention relates to a friction drive vehicle, and in particular to a friction drive vehicle suitable for use as an omni-directional vehicle that can travel in any desired direction in a two dimensional environment.

BACKGROUND OF THE INVENTION

A drive device for an omni-directional vehicle that can freely move about on a floor is known, for instance, from Japanese patent No. 3820239 (patent document 1). In particular, reference should be made to the third embodiment illustrated in FIGS. 17 and 18 of this patent document. The illustrated drive device includes a rotatively driven wheel and a plurality of shafts attached to the outer periphery of the driven wheel and each extending in a tangential direction. A barrel shaped roller divided into a plurality of parts is supported by each shaft so as to be rotatable around the shaft, and each barrel shaped roller is engaged to the adjacent rollers so as to transmit the rotational movements of the barrel shaped rollers around the corresponding shaft to one another. One of the barrel shaped rollers is rotatively actuated around the corresponding shaft by an electric motor incorporated in the driven wheel.

In this drive device, the rotation of the driven wheel applies a traction in a fore-and-aft direction (or a direction of the rotation of the driven wheel) to the ground contact surface via each barrel shaped roller, and the rotation of the individual barrel shaped rollers applies a traction in a lateral direction (or a direction of the rotation of the barrel-shaped rollers) via the ground contact surfaces of the barrel shaped rollers. Therefore, by suitably selecting the contributions of the fore-and-aft traction and lateral traction, the vehicle can travel in any desired direction.

In such a friction drive vehicle, it is essential for an efficient transmission of power from a drive roller to a driven roller that the drive roller and driven roller engage each other with an optimum contact pressure. If the contact pressure is too small, a slippage arises between the drive roller and driven roller, and this impairs the power transmission efficiency. If the contact pressure is too great, the frictional resistance produced between the drive roller and driven roller becomes excessive, and this also impairs the power transmission efficiency. Additionally, an excessive contact pressure adversely affects the bearings for the drive roller and driven roller.

Also, the optimum contact pressure may vary depending on the load of the vehicle such as the weight of the vehicle occupant. A greater load requires a greater traction, and the contact pressure must be increased in a corresponding manner so as to allow the required power to be transmitted from the drive roller to driven roller.

BRIEF SUMMARY OF THE INVENTION

Task to be Achieved by the Invention

In view of such problems of the prior art and the recognition by the inventors, a primary object of the present invention is to provide a frictional drive vehicle that can achieve an optimum contact pressure between a drive roller and a driven roller under all load conditions.

A second object of the present invention is to provide a frictional drive vehicle that can automatically adjust the contact pressure between a drive roller and a driven roller to an optimum level without requiring a complicated structure.

A third object of the present invention is to provide a frictional drive vehicle that can be favorably applied to omni-directional vehicles.

Means for Achieving the Task

According to the present invention, these objects can be at least partly accomplished by providing a friction drive vehicle, a vehicle body including a load receiving member for supporting a load acting on the vehicle; a power actuator carried by the vehicle body; a drive member supported by the vehicle body, and configured to be actuated by the power actuator; and a wheel rotatably supported by the vehicle around a wheel center, and configured to be frictionally actuated by the drive member; the load supported by the load receiving member urging the drive member toward the wheel.

In particular, the friction drive vehicle may further comprise a force transmitting member for transmitting the load supported by the load receiving member to the drive member in a direction to urge the drive member into engagement with the main wheel.

Effect of the Invention

Thereby, the contact pressure acting between the drive member and main wheel changes in dependence on the magnitude of the load (weight) acting on the load receiving member so that the contact pressure between the drive member and main wheel may be maintained at an optimum level under all conditions. Therefore, an adequate traction can be obtained without applying an excessive load to bearings of rotatable parts.

According to a particularly preferred embodiment of the present invention which is implemented as an omni-directional vehicle, the drive member comprises a rotatable member and a plurality of drive rollers each rotatably supported by the rotatable member around an axial line in a skewed relationship to a central axial line of the wheel, and the wheel comprises an annular member disposed substantially coaxially with the rotatable member and a plurality of driven rollers each rotatably supported by the annular member around a tangential line of a part of the annular member rotatably supporting the corresponding driven roller.

The friction drive vehicle may further comprise another drive member which is rotatably supported by the vehicle body and configured to be individually actuated by another power actuator, the two drive members interposing the wheel therebetween, wherein each drive member comprises a rotatable member and a plurality of drive rollers each rotatably supported by the rotatable member around an axial line in a skewed relationship to a central axial line of the wheel, and the wheel comprises an annular member disposed substantially coaxially with the rotatable member and a plurality of driven rollers each rotatably supported by the annular member around a tangential line of a part of the annular member rotatably supporting the corresponding driven roller.

The force transmitting member may consist of any member or device that can convert the load acting upon the load receiving member, such as a seat, steps and a cargo bed, into a force that urges the drive member or drive members toward the main wheel. For instance, the force transmitting member may comprise a lever member having a middle point pivotally supported by the vehicle body, a first end rotatably supporting the drive member and a second end connected to the load receiving member. It is particularly preferable if the force transmitting member is formed as a four-link parallel link mechanism so that the drive member may be urged toward the main wheel as a translational movement.

According to another embodiment of the present invention, the force transmitting member comprises a hydraulic piston of a master cylinder device configured to hydraulically transmit the load supported by the load receiving member to a piston of a slave cylinder device rotatably supporting the drive member. Alternatively, the force transmitting member comprises a first electromechanical transducer that converts the load supported by the load receiving member into electric power or signal and a second electromechanical transducer that converts the electric power or signal produced by the first electromechanical transducer into a force that urges the drive member into engagement with the main wheel. In the latter case, the first electromechanical transducer may comprise a load cell, and the second electromechanical transducer may comprise a piezoelectric device.

DETAILED DESCRIPTION OF THE PREFERRED EMBODIMENT(S)

Figure 1:
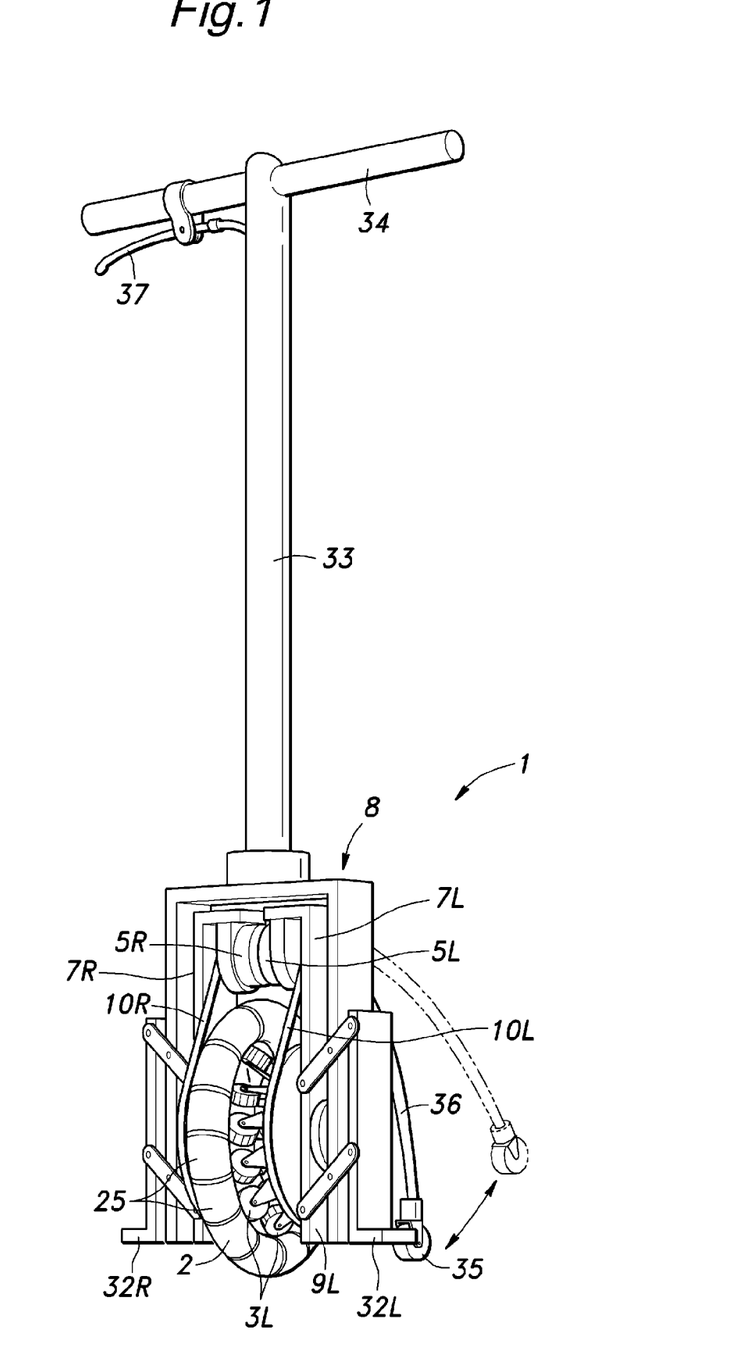
FIG. 1 is a perspective view of an exemplary friction drive vehicle.
Figure 2:
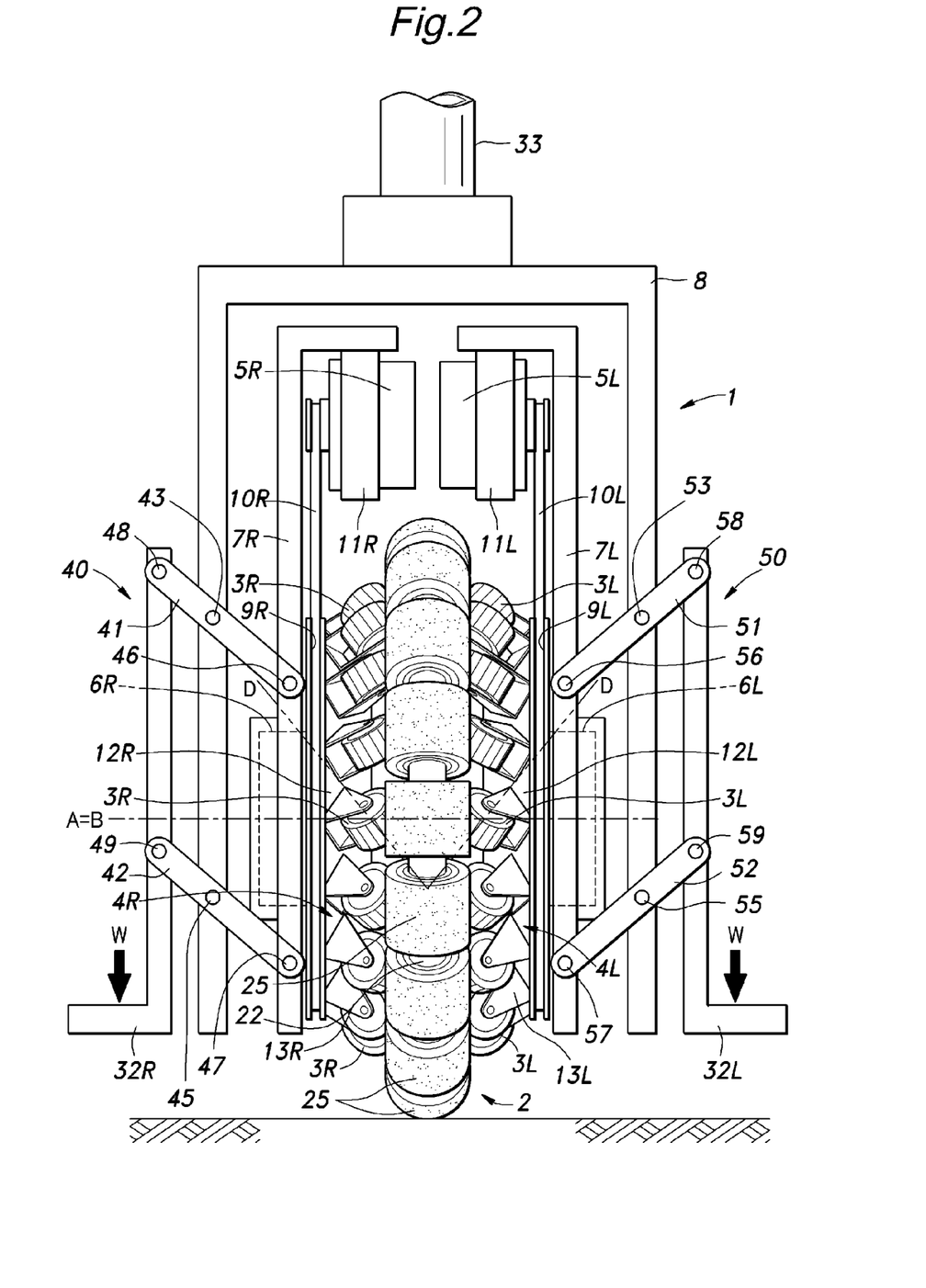
FIG. 2 is a front view of a lower portion of an exemplary friction drive vehicle.
Figure 3:
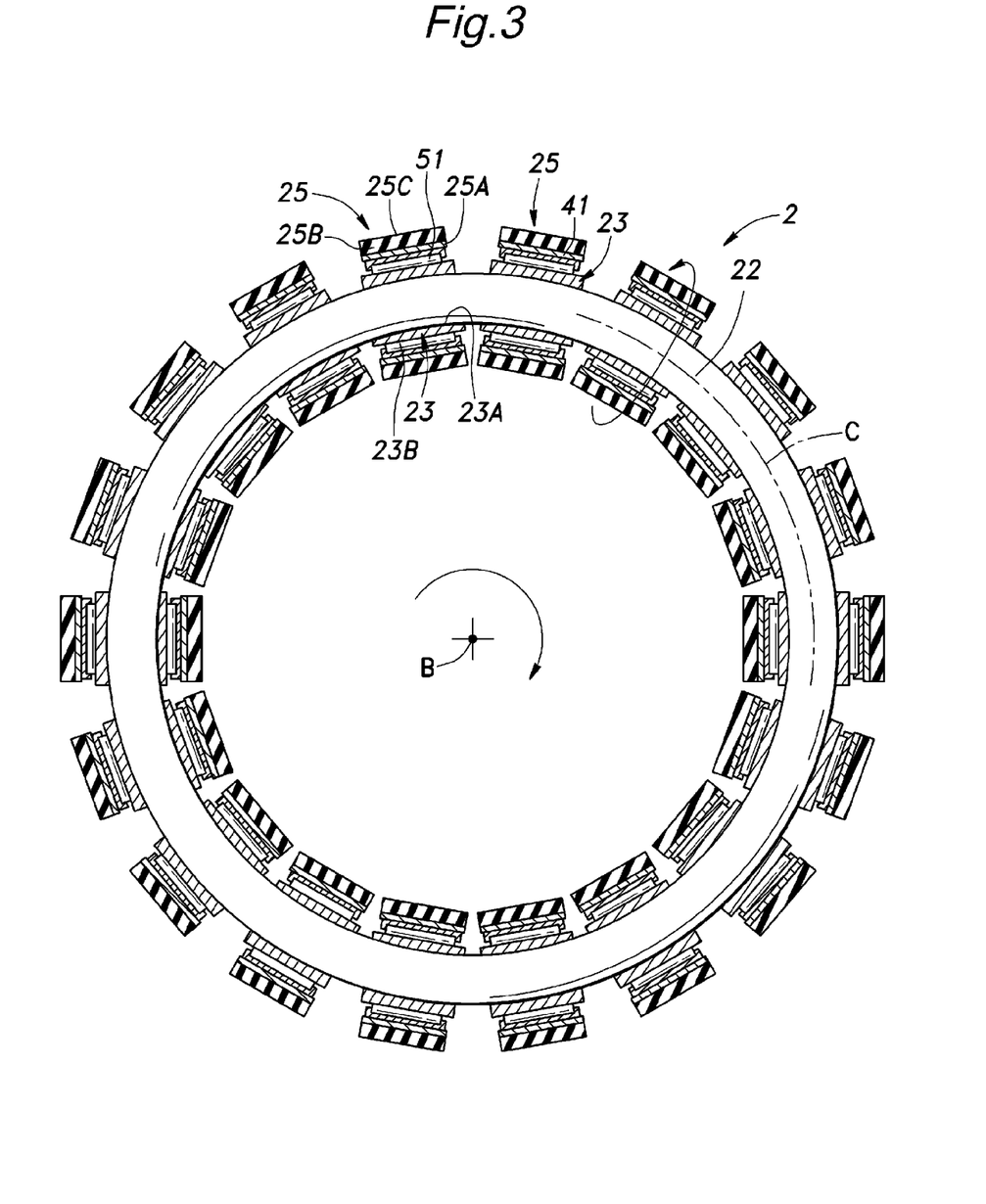
FIG. 3 is a sectional view of the main wheel of an exemplary friction drive vehicle.

Referring to FIGS. 1 to 3, an omni-directional vehicle 1 embodying the present invention is described in the following.

The omni-directional vehicle 1 of the illustrated embodiment comprises a vehicle body 8 including a pair of leg members disposed on either side and a cross member joining the upper ends of the leg members to each other. A pole 33 extends vertically upward from a middle part of the cross member and a laterally extending handle bar 34 is attached to the upper end of the pole 33.

A pair of vertical frame members consisting of a right frame member 7R and left frame member 7L are disposed inside the vehicle body 8 so as to extend in parallel with the corresponding leg members of the vehicle body 8, and are each supported by the corresponding leg member of the vehicle body 8 via a four-link parallel link mechanism 40, 50.

The right four-link parallel link mechanism 40 comprises an upper and lower link 41 and 42 having an equal length, and extending in a mutually parallel relationship. Each link 41, 42 has a middle part pivotally connected to the corresponding leg member of the vehicle body 8 via a fore-and-aft pivot pin 43, 45 and an inner end pivotally connected to a middle part of the right frame member 7R via a fore-and-aft pivot pin 46, 47. The outer end of each link 41, 42 is connected to a vertical extension of a right step 32R via a fore-and-aft pivot pin 48, 49. Each of the upper and lower links 41 and 42 is slanted upward from the inner end thereof to the outer end thereof. Therefore, the right frame member 7R is guided to move toward and away from the corresponding leg member of the vehicle body 8 as a translational movement. In particular, the right frame member 7R moves inward as the right step 32R moves downward.

The left four-link parallel link mechanism 50 comprises an upper and lower link 51 and 52 having an equal length, and extending in a mutually parallel relationship. Each link 51, 52 has a middle part pivotally connected to the corresponding leg member of the vehicle body 8 via a fore-and-aft pivot pin 53, 55 and an inner end pivotally connected to a middle part of the left frame member 7L via a fore-and-aft pivot pin 56, 57. The outer end of each link 51, 52 is connected to a vertical extension of a left step 32L via a fore-and-aft pivot pin 58, 59. Each of the upper and lower links 51 and 52 is slanted upward from the inner end thereof to the outer end thereof. Therefore, the left frame member 7L is guided to move toward and away from the corresponding leg member of the vehicle body 8 as a translational movement. In particular, the left frame member 7L moves inward as the left step 32L moves downward.

An auxiliary wheel 35 is attached to a free end of a curved arm 36 extending obliquely downward from the cross member of the vehicle body 8. The base end of the arm 36 is pivotally attached to the back side of the cross member of the vehicle body 8 so as to be raised and lowered as required. The auxiliary wheel 35 is located behind the main wheel 2, and is rotatable around a lateral and horizontal axial line. To an end of the handle bar 34 is attached a grip lever 37 which is connected to a free end of the arm 36 via a Bowden cable (not shown in the drawings) so that the arm 36 may be raised as required by pressing the grip lever 37 toward the handle bar 34.

A right rotatable member 4R is rotatably supported by the right frame member 7R via a support shaft 6R, and a left rotatable member 4L is rotatably supported by the left frame member 7L via a support shaft 6L such that the right and left rotatable members 4R and 4L are rotatable around a common axial line (A) in a laterally spaced apart relationship.

Each rotatable member 4R, 4L is coaxially formed with a pulley (or a sprocket) 9R, 9L, and a pair of electric motors 5R and 5L are attached to the right and left frame members 7R and 7L, respectively. Each motor 5R, 5L is drivingly connected to the corresponding pulley 9R, 9L via an endless belt 10R, 10L (or a link chain) so that the pulley 9R, 9L along with the rotatable members 4R, 4L may be rotatively actuated by the corresponding electric motors 5R and 5L as required.

Although not shown in the drawings, a rechargeable battery is mounted in the cross member of the vehicle body 8, right frame member 7R and/or left frame member 7L as a power source for the electric motors 5R and 5L.

Each rotatable member 4R, 4L is formed with a frusto-conical tapered outer circumferential surface 12R, 12L opposing the other. To each frusto-conical tapered outer circumferential surface 12R, 12L are mounted a plurality of drive rollers 3R, 3L each via a bracket 13R, 13L at a regular angular interval. Each of the drive rollers 3R and 3L has a central axial line (D) which is in a skewed relationship to the central axial line (A) of the rotatable members 4R and 4L, and the drive rollers 3R and 3L are mounted on the corresponding rotatable members 4R and 4L in a rotationally symmetric manner around the central axial line (A).

The main wheel 2 is located between the right and left rotatable members 4R and 4L, and is rotatably supported around a central axial line (B) coaxial with the central axial line (A) of the right and left rotatable members 4R and 4L by being interposed between the right drive rollers 3R of the right rotatable member 4R and left drive rollers 3L of the left rotatable member 4L. Thus, the vehicle body 8 indirectly supports the main wheel 2 serving as a road wheel in a rotatable manner.

The main wheel 2 comprises an annular member 22 and a plurality of driven rollers 25 rotatably supported thereby so as to be rotatable around an axial line tangential to the corresponding point of the annular member 22.

As illustrated in FIG. 3, the annular member 22 comprises a metallic annular ring, and a plurality of inner sleeves 23 each having a slightly curved inner bore 23A conforming to the corresponding outer profile of the annular member 22 is fixedly (both rotationally and circumferentially) fitted on the annular member 22. The outer circumferential surface 23B of each inner sleeve 23 defines a true cylindrical surface. The annular member 22 may also consist of a polygonal ring or a ring consisting of a plurality of segments, instead of a solid circular ring.

Each driven roller 25 comprises a metallic cylindrical inner sleeve 25A and a cylindrical outer circumferential member 25B fixedly fitted on the inner sleeve 25A and defines an outer circumferential surface of the driven roller 25. Each driven roller 25 is rotatably fitted on the outer circumferential surface 23B of the corresponding inner sleeve 23 via a needle bearing 51.

The outer circumferential member 25B of each driven roller 25 is formed by elastomer material such as urethane rubber and other rubber materials.

The drive rollers 3R and 3L may be urged against the outer circumferential surfaces 25C of the driven rollers 25 under the spring force of the compression coil spring not shown in the drawings, in addition to the force transmitted from the steps 32L and 32R to the rotatable members 4R and 4L so that a (rotative) drive force is frictionally transmitted from the outer circumferential surfaces 3Ra and 3La of the drive rollers 3R and 3L to the outer circumferential surfaces 25C of the driven rollers 25. In particular, the transmitted drive force includes a first component that forces the rotation of the main wheel 2 around a rotational center (B) thereof or along a tangential direction thereof (axial direction of each driven wheel 25) and a second component that forces the rotation of each driven wheel 25 around the axial line thereof or a cross sectional center thereof. The first component causes a forward movement of the vehicle, and the second component causes a lateral movement of the vehicle.

Each drive roller 3R, 3L is rotatable around a rotational center line (D) which is not either perpendicular or parallel to the rotational direction or the tangential direction of a circle centered around the rotational center line (B) at the point of contact, the rotational center line (B) being substantially identical to the rotational center line (A) of the rotatable members 4R and 4L. In other words, each drive roller 3R, 3L has a rotational center line (D) which is tilted with respect to the direction of the rotational movement of the main wheel 2 around the center line (B) thereof, and is skewed with respect to the rotational center line (A) of the rotatable members 4R and 4L.

Each driven roller 25 consists of a freely rotatable roller engaging an object to which a drive force is to be transmitted or applied, and is fitted around the annular member 22 like beads of a rosary. More specifically, each driven roller 25 is rotatable around a tangential direction of the annular member 46 or an axial center line (rotational center line) of the drive roller 25. The number of drive rollers 3R, 3L on each side in relation with the number of the driven rollers 25 is selected in such a manner that the driven roller 25 engaging the floor surface or road surface is engaged by at least one of the drive rollers 3R, 3L, and is thereby receives a drive force at all times.

In the illustrated embodiment, the cross sectional center line (C) of the main wheel 2 is given by joining the central axial lines of the entire driven wheels 25 together, and the rotation around the central axial line of each driven wheel 25 is effected by the rotation of the driven roller 25 around the center line thereof.

The drive rollers 3R and 3L jointly rotate with the corresponding rotatable members 4R and 4L. When each rotatable member 4R, 4L is turned, each drive wheel 3R, 3L applies a frictional force which includes a first component that causes the main wheel 2 to turn around the rotational center (A) thereof and a second component that causes the driven wheels 25 to turn around the axial center (C) thereof or the cross sectional center of the main wheel 2.

In the illustrated embodiment, the right and left electric motors 5R and 5L individually drive the corresponding rotatable members 4R and 4L.

When the rotatable members 4R and 4L rotate in the same direction at the same rotational speed, the contact between the drive rollers 3R and 3L and driven rollers 25 causes the main wheel 2 to turn around the central axial line (B) thereof, and this applies a traction force to the road surface that propels the vehicle in a forward direction.

If there is any difference in the rotational speeds of the rotatable members 4R and 4L, the contact between the drive rollers 3R and 3L and driven rollers 25 additionally causes the driven roller 25 engaging the road surface to be turned around the central axial, and this propels the vehicle sideways. As a result, the vehicle travels in an oblique direction. If the rotatable members 4R and 4L rotate in mutually opposite directions at the same speed, the driven rollers 25 engaging the road surface turns, but the main wheel 2 does not. As a result, the vehicle travels strictly sideways.

Thus, the vehicle can travel in any desired direction, but the movement is limited to a translational movement, and no yaw movement can be produced with this arrangement alone.

However, when the road wheel 2 is driven so as to rotate around the cross sectional center line (C) by tuning the electric motors 5R and 5L at different speeds with the auxiliary wheel 35 engaging the road surface, because the auxiliary wheel 35 resists a lateral movement thereof, the lateral movement of the road wheel 2 produces a yaw moment centered around the auxiliary wheel 35. In the illustrated embodiment, the auxiliary wheel 35 is located in a plane of rotation of the road wheel 2, a lateral movement of the road wheel 2 produces a yaw movement around the auxiliary wheel 35 or the ground contact point of the auxiliary wheel 35.

When riding this vehicle 1, a rider holds the two lateral ends of the handle bar 34 by his hands, and puts his feet on the respective steps 32L and 32R.

Thus, the weight of the rider W is distributed between the right and left 32L and 32R steps, and hence between the right and left frame members 7L and 7R. The two parallel link mechanisms 40 and 50 allow the right and left frame members 7L and 7R to move toward and away from each other in a mutually parallel relationship.

This causes the upper and lower link elements 41 and 42 of the four-link parallel link mechanism 40 of the right frame member 7R to turn in counter clockwise direction as seen in FIG. 2, and the right frame member 7R to move toward the wheel 2 (rightward in FIG. 2) as a translational movement. Likewise, the upper and lower link elements 51 and 52 of the four-link parallel link mechanism 50 of the left frame member 7L turn in clockwise direction as seen in FIG. 2, and the left frame member 7L moves toward the wheel 2 (leftward in FIG. 2) as a translational movement. Each of these four-link parallel link mechanisms 40 and 50 is thus considered to be a mechanism for converting the vertical load acting on the corresponding step 32L, 32R to a lateral load that urges the rotatable members 4R and 4L toward the main wheel 2.

More specifically, the weight W of the rider that is applied to the left and right steps 32L and 32R causes the right and left frame members 7R and 7L to be urged toward the wheel 2 in a corresponding manner, and this causes the right and left rollers 3R and 3L to be pushed against the driven rollers 25 of the wheel 2 by a corresponding pressure.

In other words, the right drive rollers 3R of the right frame member 7R and the left drive rollers 3L of the left frame member 7L are urged toward the wheel 2 by a pressure corresponding to the load of the vehicle, and the right and left rollers 3R and 3L are pushed against the driven rollers 25 of the wheel 2 by a corresponding pressure.

The right and left rollers 3R and 3L may be pushed against the driven rollers 25 of the wheel 2 by a certain pressure even when there is no load, and the pressure of the right and left rollers 3R and 3L may be increased in proportion to the load acting on the left and right steps 32L and 32R.

As result, the contact pressure of the right and left rollers 3R and 3L acting on the drive rollers 25 changes depending on the load of the vehicle so that the contact pressure may be maintained at an optimum level irrespective of the magnitude of the load acting on the vehicle. In other words, the power transmission from the right and left rollers 3R and 3L to the driven rollers 25 is achieved at a high efficiency and without involving any significant power loss or undue stress to the bearings irrespective of the magnitude of the load of the vehicle.

Another embodiment of the friction drive vehicle of the present invention is described in the following with reference to FIG. 4 in which the parts corresponding to those in FIG. 2 are denoted with like numerals without repeating the description of such parts.

Figure 4:
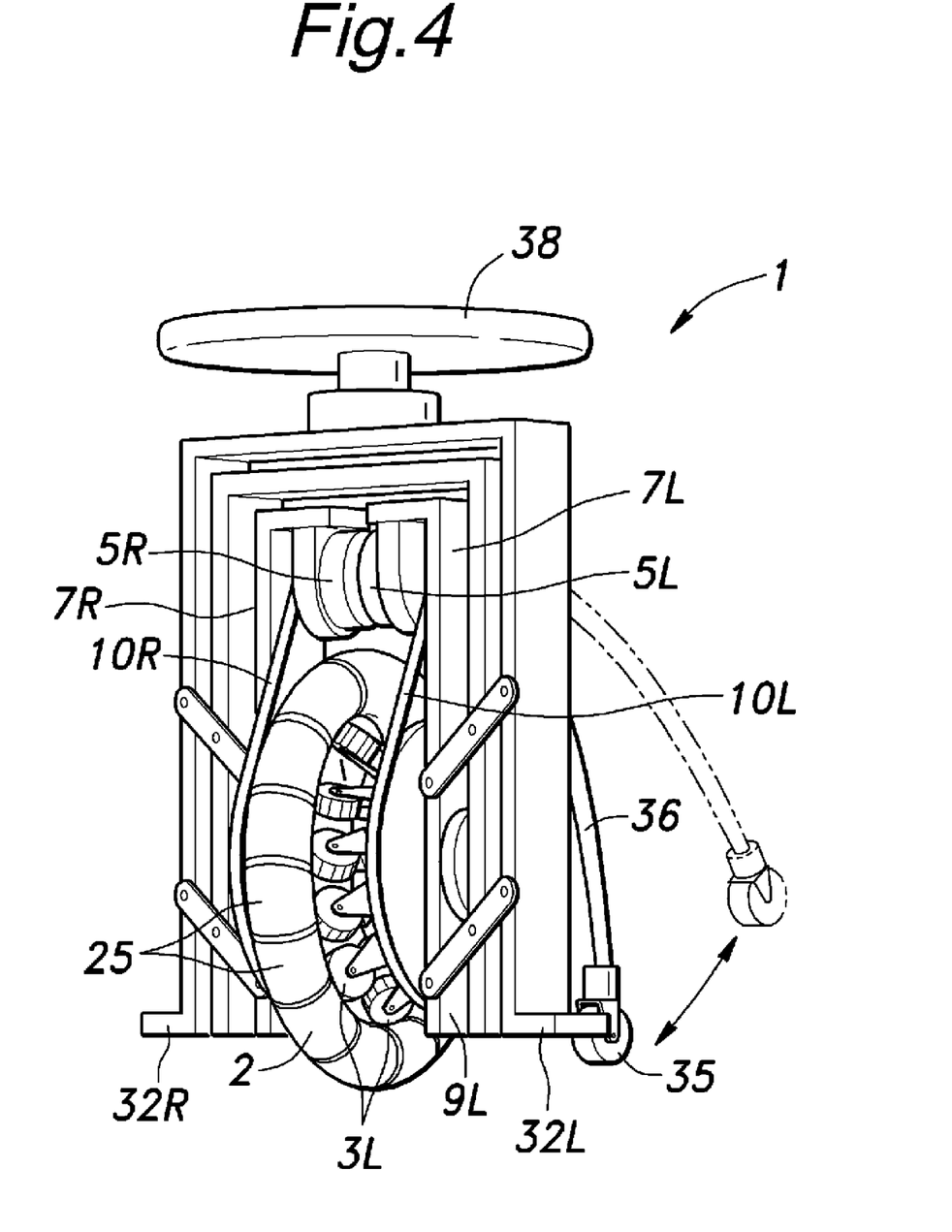
FIG. 4 is a perspective view of another exemplary friction drive vehicle having a seat.

In the embodiment illustrated in FIG. 4, a seat 38 is provided atop the cross member of the vehicle body 8, instead of the pole 33 and handle bar 34 of the previous embodiment. A rider sits upon the seat 38, and places his feet on the corresponding steps 32L and 32R. The vertical movement of the arm 36 carrying the auxiliary wheel 35 may be effected by means of an electric actuator (not shown in the drawings) which is controlled by an electric switch (also not shown in the drawings).

Figure 5:
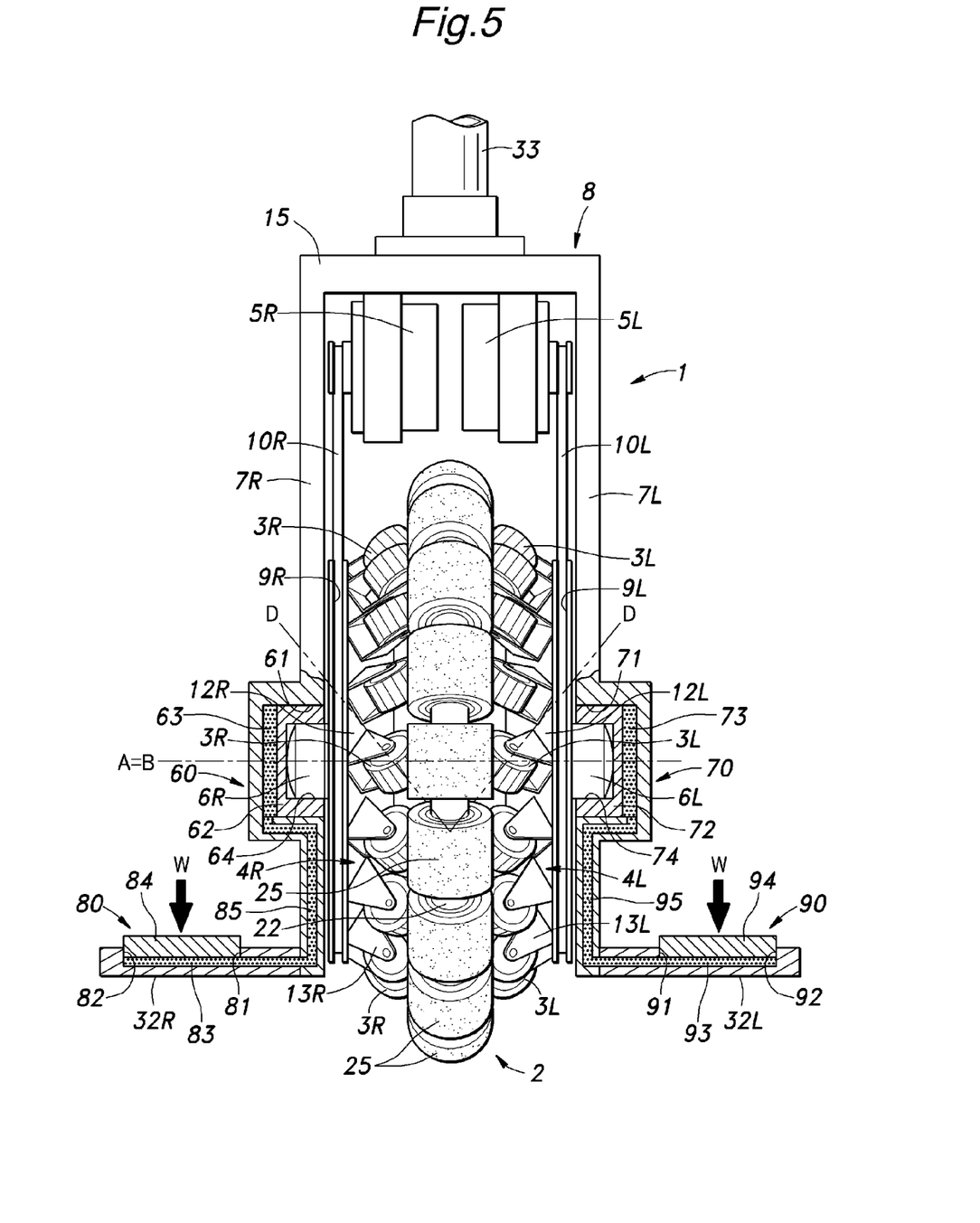
FIG. 5 is a front view of a lower portion of another exemplary friction drive vehicle employing hydraulic components.

FIG. 5 shows yet another embodiment of the friction drive vehicle of the present invention. In FIG. 5, the parts corresponding to those in FIG. 2 are denoted with like numerals without repeating the description of such parts.

In this embodiment the right and left frame members 7L and 7R are joined to each other at their upper ends by a connecting member 15, and these members jointly form a vehicle body 8 having an integral gate-like structure.

Each of the right and left frame members 7R and 7L is incorporated with a hydraulic slave cylinder device 60, 70 for pressurization. The right hydraulic slave cylinder device 60 comprises a cylinder bore 61 formed in the right frame member 7R in a coaxial relationship to the central axial line (A) and a piston 62 received in the cylinder bore 61 so as to be moveable along the central axial line (A), defining a pressure chamber 63 on the left hand side of the piston as seen in FIG. 5. The piston 62 is coaxially formed with a bearing hole 64 that rotatably supports a support shaft 6R of the right rotatable member 4R. The hydraulic right slave cylinder device 60 is thus configured to urge the support shaft 6R via the piston 62 toward the wheel 2 (rightward as seen in FIG. 5) by a force corresponding to an increase in the pressure in the pressure chamber 63.

The left hydraulic slave cylinder device 70 comprises a cylinder bore 71 formed in the left frame member 7L in a coaxial relationship to the central axial line (A) and a piston 72 received in the cylinder bore 71 so as to be moveable along the central axial line (A), defining a pressure chamber 73 on the right hand side of the piston as seen in FIG. 5. The piston 72 is coaxially formed with a bearing hole 74 that rotatably supports a support shaft 6L of the left rotatable member 4L. The hydraulic right slave cylinder device 70 is thus configured to urge the support shaft 6L via the piston 72 toward the wheel 2 (rightward as seen in FIG. 5) by a force corresponding to an increase in the pressure in the pressure chamber 73.

Each of the steps 32R, 32L is incorporated with a hydraulic master cylinder device 80, 90 for receiving pressure. The right hydraulic master cylinder device 80 comprises a cylinder bore 81 formed in the right step 32R and having an opening directed upward and a piston 82 received in the cylinder bore 81 so as to be vertically moveable, defining a pressure chamber 83 under the piston 82. The piston 82 has an upper end 84 exposed atop the right step 32R that serves as a footrest.

The left hydraulic master cylinder device 90 comprises a cylinder bore 91 formed in the left step 32L and having an opening directed upward and a piston 92 received in the cylinder bore 91 so as to be vertically moveable, defining a pressure chamber 93 under the piston 92. The piston 92 has an upper end 94 exposed atop the left step 32L that serves as a footrest.

The right frame member 7R and right step 32R internally define a fluid pressure passage 85 that communicates the two pressure chambers 63 and 83 to each other. The pressure chambers 63 and 83 and fluid pressure passage 85 are filled with non-compressive fluid such as oil serving as a pressure medium. Likewise, the left frame member 7L and left step 32L internally define a fluid pressure passage 95 that communicates the two pressure chambers 73 and 93 to each other. The pressure chambers 73 and 93 and fluid pressure passage 95 are filled with non-compressive fluid such as oil serving as a pressure medium.

In the illustrated embodiment, a rider places his right and left feet on the upper ends 84 and 94 of pistons 82 and 92 provided on the right and left steps 32R and 32L, respectively, and holds the two ends of the handle bar 34 with both hands (see FIG. 1).

By thus placing a foot on the piston 82, 92 on each step 32R, 32L, the weight of the rider is applied on the piston 82, 92 as a downward force. This causes an increase in the internal pressure of the master pressure chamber 83, 93, and the increased pressure is transmitted to the slave pressure chambers 63, 73 so that the right piston 62 pushes the right frame member 7R toward the wheel 2 (rightward in FIG. 5) and left piston 72 pushes the left frame member 7L toward the wheel 2 (leftward in FIG. 5).

Thus, the weight W of the rider acting on the piston 92 of the left step 32L and the piston 82 of the right step 32R causes the right frame member 7R and left frame member 7L to move toward the wheel 2 by an extent corresponding to the weight W or the magnitude of the load, and the right drive rollers 3R and left drive rollers 3L are pushed against the driven rollers 25 of the wheel 2 by a force corresponding to this movement. The amplification and diminishing of the transmitted force can be selected at will by suitably selecting the ratio of the pressure receiving surface area of the piston 62, 72 of the slave cylinder device 60, 70 to that of the piston 84, 94 of the master cylinder device 80, 90.

As a result, in this embodiment also, the contact pressure of the right and left drive rollers 3R and 3L applied to the driven wheels 25 changes depending on the load, and is maintained at an optimum level without regard to the magnitude of the load. In other words, the power transmission from the right and left rollers 3R and 3L to the driven rollers 25 is achieved at a high efficiency and without involving any significant power loss or undue stress to the bearings irrespective of the magnitude of the load of the vehicle.

Figure 6:
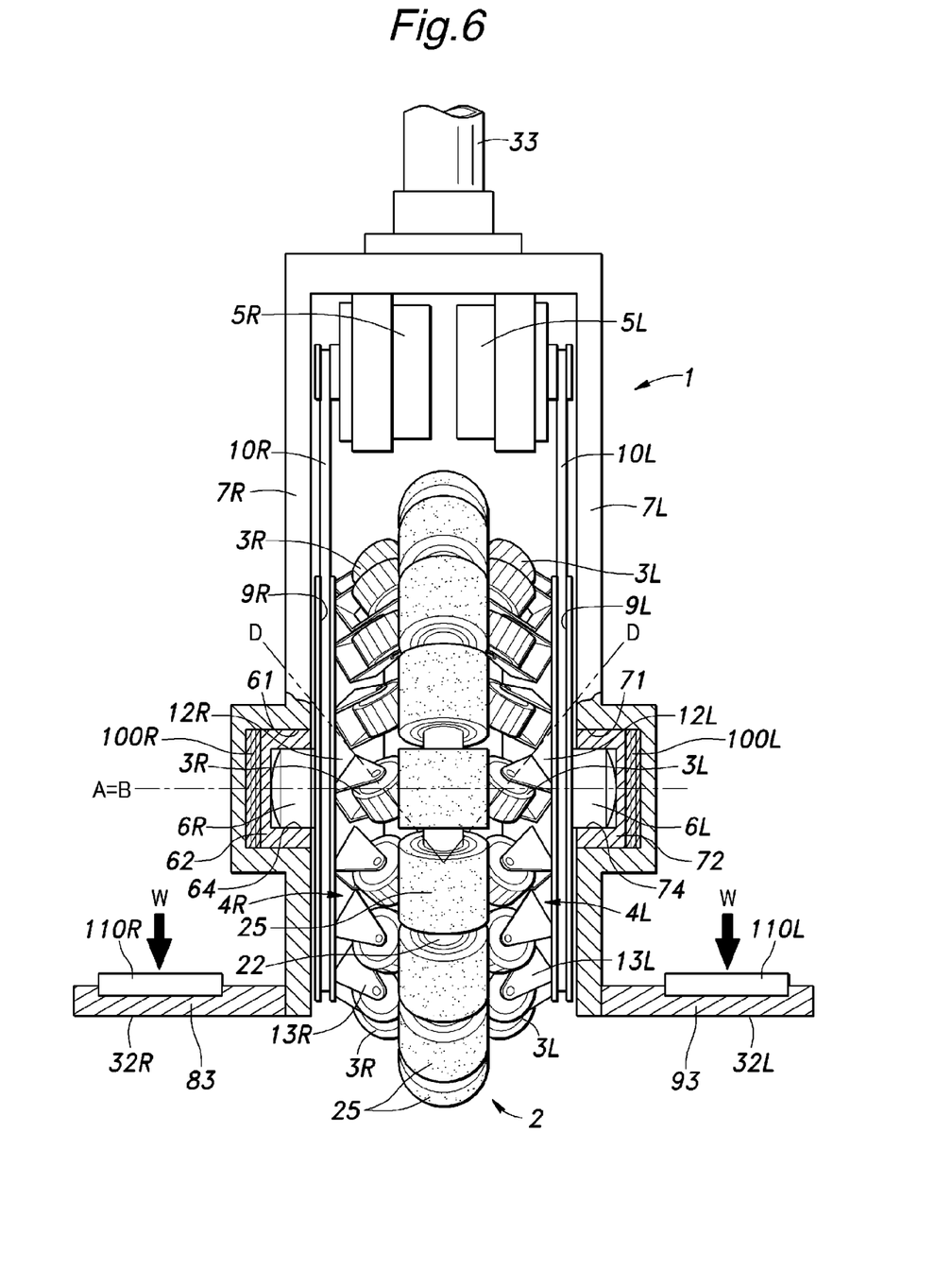
FIG. 6 is a front view of a lower portion of another exemplary friction drive vehicle employing piezoelectric components.

FIG. 6 shows yet another embodiment of the friction drive vehicle of the present invention. In FIG. 6, the parts corresponding to those in FIG. 5 are denoted with like numerals without repeating the description of such parts.

In this embodiment, the right and left frame members 7R and 7L are each incorporated with a piezoelectric device 100R, 100L serving as a linear actuator (electromechanical transducer) for applying pressure. Each piezoelectric device 100R, 100L is disposed coaxially with respect to the central axial line (A), and abuts the axial end of the corresponding support shaft 6R, 6L via a piston 62, 72 so that the corresponding support shaft 6R, 6L is urged toward the wheel 2 by a force corresponding to a voltage applied to the piezoelectric device 100R, 100L.

Each step 32R, 32L is fitted with a load cell 110R, 110L (electromechanical transducer) configured to detect a load acting thereon. More specifically, each load cell 110R, 110L determines the weight W of the rider or the load when the feet of the rider are placed on the corresponding steps 32R, 32L.

The piezoelectric device 100R, 100L are electrically connected to the corresponding load cells 110R, 110L, and receive voltages that depend on the loads applied to the corresponding load cells 110R, 110L.

Therefore, the right and left support shafts 6R and 6L are urged toward the main wheel 2 by a force corresponding to the load, and the contact pressure of the right and left drive rollers 3R and 3L acting on the driven rollers 25 changes in dependence on the load of the vehicle.

Thus, in this embodiment also, the contact pressure of the right and left drive rollers 3R and 3L applied to the driven wheels 25 changes depending on the load, and is maintained at an optimum level without regard to the magnitude of the load. In other words, the power transmission from the right and left rollers 3R and 3L to the driven rollers 25 is achieved at a high efficiency and without involving any significant power loss or undue stress to the bearings irrespective of the magnitude of the load of the vehicle.

The linear actuators used in this embodiment may also consist of any other known actuators which may be electromagnetic, hydraulic, pneumatic, etc. instead of the piezoelectric devices.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art mentioned in this application are incorporated in this application by reference.

The invention claimed is:

1. A friction drive vehicle, comprising:
a vehicle body including a load receiving member for supporting a load acting on the vehicle;
a power actuator carried by the vehicle body;
a drive member supported by the vehicle body, and configured to be actuated by the power actuator; and
a wheel rotatably supported by the vehicle around a wheel center, and configured to be frictionally actuated by the drive member;
the load receiving member capable of urging the drive member toward the wheel, wherein the drive member comprises a rotatable member and a plurality of drive rollers each rotatably supported by the rotatable member around an axial line in a skewed relationship to a central axial line of the wheel, and the wheel comprises an annular member disposed substantially coaxially with the rotatable member and a plurality of driven rollers each rotatably supported by the annular member around a tangential line of a part of the annular member rotatably supporting the corresponding driven roller.

2. The friction drive vehicle according to claim 1, further comprising a force transmitting member for transmitting the load supported by the load receiving member to the drive member in a direction to urge the drive member into engagement with the main wheel.

3. The friction drive vehicle according to claim 2, wherein the force transmitting member comprises a lever member having a middle point pivotally supported by the vehicle body, a first end rotatably supporting the drive member and a second end connected to the load receiving member.

4. The friction drive vehicle according to claim 2, wherein the force transmitting member comprises a hydraulic piston of a master cylinder device configured to hydraulically transmit the load supported by the load receiving member to a piston of a slave cylinder device rotatably supporting the drive member.

5. The friction drive vehicle according to claim 2, wherein the force transmitting member comprises a first electromechanical transducer that converts the load supported by the load receiving member into electric power or signal and a second electromechanical transducer that converts the electric power or signal produced by the first electromechanical transducer into a force that urges the drive member into engagement with the main wheel.

6. The friction drive vehicle according to claim 5, wherein the first electromechanical transducer comprises a load cell, and the second electromechanical transducer comprises a piezoelectric device.

7. A friction drive vehicle, comprising:
a vehicle body including a load receiving member for supporting a load acting on the vehicle;
a power actuator carried by the vehicle body;
a drive member supported by the vehicle body, and configured to be actuated by the power actuator;
a wheel rotatably supported by the vehicle around a wheel center, and configured to be frictionally actuated by the drive member; and
a second drive member which is rotatably supported by the vehicle body and configured to be individually actuated by a second power actuator, the two drive members interposing the wheel therebetween,
the load receiving member capable of urging the drive members toward the wheel, wherein each drive member comprises a rotatable member and a plurality of drive rollers each rotatably supported by the rotatable member around an axial line in a skewed relationship to a central axial line of the wheel, and the wheel comprises an annular member disposed substantially coaxially with the rotatable member and a plurality of driven rollers each rotatably supported by the annular member around a tangential line of a part of the annular member rotatably supporting the corresponding driven roller.

8. The friction drive vehicle according to claim 7, further comprising a force transmitting member for transmitting the load supported by the load receiving member to the drive member in a direction to urge the drive member into engagement with the main wheel.

9. The friction drive vehicle according to claim 8, wherein the force transmitting member comprises a lever member having a middle point pivotally supported by the vehicle body, a first end rotatably supporting the drive member and a second end connected to the load receiving member.

10. The friction drive vehicle according to claim 8, wherein the force transmitting member comprises a hydraulic piston of a master cylinder device configured to hydraulically transmit the load supported by the load receiving member to a piston of a slave cylinder device rotatably supporting the drive member.

11. The friction drive vehicle according to claim 8, wherein the force transmitting member comprises a first electromechanical transducer that converts the load supported by the load receiving member into electric power or signal and a second electromechanical transducer that converts the electric power or signal produced by the first electromechanical transducer into a force that urges the drive member into engagement with the main wheel.

12. The friction drive vehicle according to claim 11, wherein the first electromechanical transducer comprises a load cell, and the second electromechanical transducer comprises a piezoelectric device.

\* \* \* \* \*